(12) United States Patent
Czyzewski et al.

(10) Patent No.: US 10,355,470 B2
(45) Date of Patent: Jul. 16, 2019

(54) CABLE FITTING FOR CONNECTING A HIGH-VOLTAGE CABLE TO A HIGH-VOLTAGE COMPONENT

(71) Applicant: ABB Schweiz AG, Baden (CH)

(72) Inventors: Jan Czyzewski, Cracow (PL); Victoria Maurer, Solothurn (CH); Radim Lichy, Alingsås (SE); Torbjorn Sorqvist, Alingsås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/935,724

(22) Filed: Mar. 26, 2018

(65) Prior Publication Data
US 2018/0219369 A1 Aug. 2, 2018

Related U.S. Application Data

(63) Continuation of application No. PCT/EP2016/072492, filed on Sep. 22, 2016.

(30) Foreign Application Priority Data

Sep. 25, 2015 (EP) ..................... 15186899

(51) Int. Cl.
*H01B 7/02* (2006.01)
*H01R 4/18* (2006.01)
(Continued)

(52) U.S. Cl.
CPC .............. *H02G 15/06* (2013.01); *H01B 7/02* (2013.01); *H02G 15/02* (2013.01);
(Continued)

(58) Field of Classification Search
None
See application file for complete search history.

(56) References Cited

U.S. PATENT DOCUMENTS 1,744,929 A * 1/1930 Smith .................... H01B 17/26
174/167
1,870,141 A * 8/1932 Regerbis .................. H01G 4/28
174/140 C
(Continued)

FOREIGN PATENT DOCUMENTS

DE 19945148 A1 3/2001
EP 0731994 A1 9/1996
(Continued)

OTHER PUBLICATIONS

European Patent Office, International Search Report & Written Opinion issued in corresponding Application No. PCT/EP2016/072492, dated Dec. 2, 2016, 12 pages.
(Continued)

*Primary Examiner* — Dimary S Lopez Cruz
*Assistant Examiner* — Muhammed Azam
(74) *Attorney, Agent, or Firm* — Taft, Stettinius & Hollister LLP; J. Bruce Schelkopf

(57) ABSTRACT

A high-voltage cable fitting, typically a cable end termination or a cable joint, includes coaxially arranged around an axis a rigid conical insulator, an electrically insulating, elastomeric stress-relief cone matching the rigid conical insulator through a conical interface and an axially aligned current path. The current path connects a conductor of the cable to a high-voltage current terminal arranged on top of the rigid conical insulator and provided for connection to a high-voltage component. The rigid conical insulator is configured as a condenser core and includes a plurality of electrically conductive field-grading layers, which are arranged concentrically around the axis, and a rigid polymeric matrix which embeds the field-grading layers. In order to keep the size of the cable fitting small and to enable the fitting to carry high rated continuous currents a section of the cable conductor, which is stripped off the insulation of the (Continued)

cable, extends from the conical interface to the high-voltage current terminal and forms the axially aligned current path, and the condenser core comprises an axially aligned tubular duct which receives the stripped-off section of the cable conductor and which passes two opposing front faces of the condenser core.

22 Claims, 2 Drawing Sheets

(51) Int. Cl.
| | | |
|---|---|---|
| H01R 11/26 | (2006.01) | |
| H02G 15/02 | (2006.01) | |
| H02G 15/06 | (2006.01) | |
| H02G 15/064 | (2006.01) | |
| H02G 15/072 | (2006.01) | |

(52) U.S. Cl.
CPC ......... *H02G 15/064* (2013.01); *H02G 15/072* (2013.01); *H01R 4/183* (2013.01); *H01R 11/26* (2013.01)

(56) References Cited

U.S. PATENT DOCUMENTS

| | | | | | |
|---|---|---|---|---|---|
| 1,935,228 | A | * | 11/1933 | Kopeliowitsch | H01B 17/005 174/31 R |
| 1,983,370 | A | * | 12/1934 | Hillebrand | H01B 17/26 174/11 BH |
| 1,986,844 | A | * | 1/1935 | Meyer | H02G 15/22 174/20 |
| 2,045,781 | A | * | 6/1936 | Kasarjian | H01T 13/36 123/169 CB |
| 2,079,231 | A | * | 5/1937 | Smith | H01G 4/00 174/142 |
| 2,093,567 | A | * | 9/1937 | McCullough | H01J 5/32 141/8 |
| 2,188,417 | A | * | 1/1940 | Rorden | H01B 17/28 174/12 BH |
| 2,263,768 | A | * | 11/1941 | Frakes | H01B 17/28 174/143 |
| 2,298,118 | A | * | 10/1942 | Gale | H01B 17/28 174/143 |
| 2,322,214 | A | * | 6/1943 | Kirkwood | H01B 17/28 174/140 R |
| 2,381,787 | A | * | 8/1945 | Terpak | H01B 17/34 174/12 BH |
| 2,452,580 | A | * | 11/1948 | Lee | H02G 15/06 174/167 |
| 2,458,948 | A | * | 1/1949 | Lincks | H02H 7/04 174/152 R |
| 2,606,950 | A | * | 8/1952 | Macardier | H01B 17/28 174/120 FP |
| 2,846,495 | A | * | 8/1958 | Link | H01B 17/34 174/122 R |
| 2,894,054 | A | * | 7/1959 | Cameron | H01H 33/24 174/140 R |
| 3,001,005 | A | * | 9/1961 | Sonnenberg | H01B 17/28 174/142 |
| 3,049,581 | A | * | 8/1962 | Palmieri | H02G 15/068 174/142 |
| 3,318,995 | A | * | 5/1967 | Buckley | H01B 17/28 174/142 |
| 3,356,788 | A | * | 12/1967 | Callahan | H02G 15/064 174/143 |
| 3,376,541 | A | * | 4/1968 | Link | H01R 13/53 174/18 |
| 3,394,455 | A | * | 7/1968 | Grimmer | H01B 3/40 174/143 |
| 3,539,706 | A | * | 11/1970 | Vittorio | H02G 15/06 174/73.1 |
| 3,646,251 | A | * | 2/1972 | Friedrich | H01B 17/28 174/142 |
| 3,865,968 | A | * | 2/1975 | Heumann | H02G 15/22 174/15.3 |
| 3,898,372 | A | * | 8/1975 | Kalb | H01B 17/14 174/137 B |
| 3,902,000 | A | * | 8/1975 | Forsyth | H02G 15/34 174/15.3 |
| 4,670,625 | A | * | 6/1987 | Wood | H01B 17/301 174/142 |
| 4,965,407 | A | * | 10/1990 | Hamm | H01B 17/26 174/142 |
| 5,130,495 | A | * | 7/1992 | Thompson | H02G 15/068 174/142 |
| 5,466,891 | A | * | 11/1995 | Freeman | H01B 17/28 174/11 BH |
| 6,333,462 | B1 | * | 12/2001 | Quaggia | H02G 15/06 174/73.1 |
| 6,677,536 | B2 | * | 1/2004 | Alznauer | H02G 15/013 174/152 G |
| 6,737,587 | B2 | * | 5/2004 | Amerpohl | H02G 15/06 174/140 C |
| 7,495,172 | B2 | * | 2/2009 | Amerpohl | H02G 15/064 174/142 |
| 7,775,238 | B2 | * | 8/2010 | Prahl | F16L 41/08 137/560 |
| 2009/0211805 | A1 | * | 8/2009 | Roseen | H02G 15/068 174/650 |
| 2009/0239751 | A1 | * | 9/2009 | Lallouet | H01R 4/68 505/163 |
| 2010/0051306 | A1 | * | 3/2010 | Tornkvist | H01B 7/428 174/15.3 |
| 2010/0200274 | A1 | * | 8/2010 | Jonsson | B29C 70/58 174/137 B |
| 2010/0258347 | A1 | * | 10/2010 | Roseen | H01B 17/303 174/668 |
| 2010/0284133 | A1 | * | 11/2010 | Skryten | H02G 3/22 361/679.01 |
| 2016/0148727 | A1 | * | 5/2016 | Weatherbee | H01B 17/301 174/152 G |
| 2016/0172072 | A1 | * | 6/2016 | Murata | H01B 3/28 174/84 R |
| 2017/0201040 | A1 | * | 7/2017 | Tan | H01R 13/53 |
| 2018/0219323 | A1 | * | 8/2018 | Czyzewski | H01R 13/5205 |
| 2018/0219369 | A1 | * | 8/2018 | Czyzewski | H02G 15/02 |

FOREIGN PATENT DOCUMENTS

| | | |
|---|---|---|
| EP | 1254497 A1 | 11/2002 |
| EP | 1269594 B1 | 5/2005 |
| EP | 1774632 A1 | 4/2007 |
| EP | 2375423 A1 | 10/2011 |
| WO | 2006010280 A1 | 2/2006 |
| WO | 2007068130 A1 | 6/2007 |
| WO | 2011144253 A2 | 11/2011 |
| WO | 2011144254 A2 | 11/2011 |

OTHER PUBLICATIONS

European Patent Office, Extended Search Report issued in corresponding Application No. 15186899.9, dated Mar. 24, 2016, 8 pages.

ABB Schweiz AG, PCT Direct Letter submitted to European Patent Office on Sep. 21, 2016 in corresponding Application No. PCT/EP2016/072492, 5 pages.

* cited by examiner

CABLE FITTING FOR CONNECTING A HIGH-VOLTAGE CABLE TO A HIGH-VOLTAGE COMPONENT

TECHNICAL FIELD

The invention relates to a cable fitting for connecting a high-voltage cable to a high-voltage component according to the introductory part of claim 1. Such a cable fitting usually is designed as a cable end termination, in particular as a high-voltage outdoor cable end termination for application in a voltage range from 52 kV up to 1100 kV. The cable end termination can also be designed as a high-voltage indoor cable end termination, typically for a transformer or for a high-voltage gas-insulated switchgear component.

In general the high voltage can range from at least 1 kV to more than 1200 kV. Furthermore the cable fitting is typically designed as a high-voltage cable end termination but can also be designed as a high-voltage cable joint.

Most of the cable fittings are designed as high-voltage outdoor cable end terminations and are made with a hollow-core insulator which is filled with insulating oil. The cable is fixed to a base part of the cable end termination by means of a cable clamp and enters the interior of the cable end termination through an elastomeric stress-relief cone. The function of the stress-relief cone is to provide a smooth transition of the very high electric field in the electric insulation of the cable into a much lower electric field in the interior of the cable end termination. The cable end termination is built as a hollow-core insulator closed at its bottom by the base part of the cable end termination and at the top by a head electrode. In the head electrode the end of the conductor of the cable is stripped of its insulation and is electrically connected to a bolt of the high-voltage terminal of the cable end termination. The hollow-core insulator is filled with insulating oil. The oil serves both to provide sufficient dielectric withstand to the electric field around the stress-relief cone and around the insulation of a current path which passes the cable end termination and to transport heat generated by the electric losses in the cable end termination outside towards the external surface of the cable end termination.

Oil filing poses a number of disadvantages. Filling of a cable end termination or any other cable fitting, like a cable joint, with oil has to be done on-site at the construction spot and requires special care to assure cleanliness of the filled oil and to avoid risk of oil spill and contamination of the outer parts of the cable fitting and of the environment. A risk of oil leakage and, in consequence, of environmental pollution persists also in operation during the service of the cable fitting. Oil typically is not fire-resistant which poses a risk of fire or even explosion in case of a failure of the cable fitting.

In order to improve most of the afore-described properties of the cable fitting, like the high-voltage cable end terminations or the high-voltage cable joint, a liquid-free dry insulation is substituted for the filled oil all-over in the device.

Known dry high-voltage cable end terminations and cable joints typically comprise coaxially arranged around an axis a rigid conical insulator, an electrically insulating, elastomeric stress-relief cone matching the rigid conical insulator through a conical interface and an axially aligned current path. The current path connects a cable conductor, which is encased in an insulation of the cable, to a high-voltage current terminal arranged on top of the rigid conical insulator and which is provided for connection to the high-voltage component. During operation the current path in general continuously conducts a rated current.

The rigid conical insulator can be configured as a condenser core and then comprises a plurality of at least two electrically conductive field-grading layers which are arranged concentrically around the axis and a rigid polymeric matrix which embeds the field-grading layers. The condenser core usually is manufactured in resin impregnated paper (RIP) technology in which a number of layers of paper is wound onto a mandrel of cylindrical shape. During the winding, when defined diameters of the wound paper are achieved, electrically conducting layers, typically in the form of sheets of aluminum foil, are inserted between the layers of the paper to form the cylindrical field grading layers. The number, the insertion diameters and the dimensions of the field-grading layers are adjusted to the size of the HV component and to its performance parameters so as to ensure a proper grading of the electric field in the device. The mandrel, together with a wound core comprising the wound paper and the enclosed field-grading layers is placed in a cylindrical mould which is filled with a hardenable resin. During the filling process the paper is impregnated with the resin. Following the complete filling and impregnation of the wound core the resin hardening process is carried out. Hardened resin together with the paper and the foil form a material with high mechanical resistance and good electrically insulating properties, which are required for the condenser core. After the resin is hardened, the condenser core is machined to the desired shape of the rigid conical insulator.

There is known a number of solutions providing such a dry cable fitting. Some of these known solutions are discussed as follows.

PRIOR ART

EP 1 774 632 B1 describes a high-voltage outdoor cable end termination in which SF6 gas or a gel-like insulating medium replaces the filling oil. However, the SF6 gas poses risks related to environmental pollution in case of leakage, whereas the gel-like insulating medium typically comprises a low breakdown strength and thus requires the diameter of the insulator to be very large. These properties combined with the low thermal conductivity of the materials replacing the filling oil limit the thermal transport of the heat generated in a current path of the cable end termination and thus limit the maximal electric current rating of the known cable end termination.

A fully solid-state-insulation high-voltage cable end fitting, like a cable end termination and a cable joint, is described in EP 0 731 994 B2. The described cable fitting consists of a rigid insulator and a matching cable connector featuring a stress-relief cone with elastomeric insulation. The matching of the rigid insulator and the elastomeric stress-relief cone may be done according to an inner cone resp. to an outer cone interface, wherein the elastomeric stress-relief cone fits into a hollow conical space within the rigid insulator resp. the rigid insulator fills a hollow conical space in the elastomeric stress-relief cone.

In an embodiment configured as an outdoor cable end termination the rigid insulator features a conductor of a current path, which together with the rigid insulator is covered with a rubber sheath forming an outdoor insulator. The current path is electrically connected to an end section of the cable conductor within the rigid insulator. The rigid insulator can feature a non-linear material which forces spreading of the equipotential lines of the electric field, thus reducing the axial component of the field. However, the cable end termination lacks any means for reducing the radial component of the electric field within the rigid insulator.

A similar solution of a high-voltage outdoor cable end termination featuring the inner cone type of interface, is described in EP 1 254 497 B1 and EP 1 269 594 B1. However, this solution comprises a strong electric field in the region of the stress-relief cone. The strong electric field decreases slowly towards the outer surface of the known cable end termination and, in consequence, a large insulation thickness is needed in order to achieve a strength of the electric field outside the cable end termination not exceeding values which could cause corona discharges. This makes the external terminal diameter of the cable end termination large and requires large amounts of insulating material for its manufacturing. Moreover, the components of an electric contact arrangement between a conductor of the rigid part and the cable conductor make the diameter of the current path locally much larger than the diameter of a conductor integrated in the rigid insulator. This pushes the electric field even more outside and requires an additional increase of the diameter of the cable end termination. Furthermore, the electric resistance of the contact arrangement causes the generation of additional heat. The ability to evacuate this heat outside of the termination is limited due to the large thickness of the insulation thus, in turn, limiting the maximal current rating of the cable termination.

DE 199 45 148 A1 discloses a further solid-state-insulated high-voltage outdoor cable end termination. The cable end termination comprises an outdoor insulator which encloses a condenser core with concentrically arranged electrically conductive field-grading layers. The layers are positioned around a conductor extension running centrally through an outdoor insulator. The conductor extension at its bottom end has a contact socket for receiving a matching plug of a cable connector with an outside cone and at its top end has a head electrode for connection to a high-voltage power application. The condenser core, the conductor extension and the contact socket are embedded in a hardened polymeric mass which together with the outdoor insulator forms a rigid insulator with an inside cone. The conductor of the high-voltage cable is electrically connected to the contact socket by means of the matching plug. The field-grading layers form a capacitive field-grading system which makes the radial component of the electric field inside the rigid insulator of the known outdoor cable end termination more uniform. The axial component of the electric field at the outer surface of the rigid insulator is also made more uniform. The field at the end of the cable is shaped by a stress-relief cone which matches the rigid outdoor insulator through an inner-cone-type interface. The capacitive field grading solves the problems listed for the afore-discussed cable fittings only partly. The minimum diameter of the field-grading system is limited by the large diameter of the electric contact formed by the socket of the conductor extension and the plug matching it. This again makes the outer diameter of the termination large and at the same times poses strong limitations on the ability to remove heat from the socket-plug contact and from the conductor extension.

DESCRIPTION OF THE INVENTION

It is an object of the invention as described in the patent claims to specify a cable fitting of the afore-mentioned type which is small-sized and which at the time is capable to carry high-rated continuous currents.

The invention supplies a cable fitting for connecting a high-voltage cable having a cable conductor and a cable insulation, which encases the cable conductor, to a high-voltage component. The cable fitting comprises coaxially arranged around an axis a rigid conical insulator, an electrically insulating, elastomeric stress-relief cone matching the rigid conical insulator through a conical interface and an axially aligned current path which connects the cable conductor to a high-voltage current terminal arranged on top of the rigid conical insulator and provided for connection to the high-voltage component. The rigid conical insulator is configured as a condenser core and comprises a plurality of electrically conductive field-grading layers which are arranged concentrically around the axis and a rigid polymeric matrix which embeds the field-grading layers. A section of the cable conductor, which is stripped-off the cable insulation, extends from the conical interface to the high-voltage current terminal and forms the current path. The condenser core comprises an axially aligned tubular duct which receives the stripped-off section of the cable conductor and which passes two opposing front faces of the condenser core.

The cable fitting according to the invention distinguishes over prior art cable fittings with a small electric resistance of the current path which is formed as an uninterrupted cable conductor having a well-defined constant cross-section and running through the condenser core without any electric connection, thus having small ohmic losses and generating small amount of heat. Another advantage is the small diameter of the current path of the cable fitting on the whole length of the condenser core thus allowing for a small diameter of the innermost field-grading layer and, in consequence, a small diameter of the whole condenser core. This allows for manufacturing the condenser core using less amount of insulating material and also decreases the radial thermal resistance of the condenser core improving its ability to dissipate heat from the cable conductor running through the condenser core. The small ohmic losses of the current path combined with the large ability to dissipate heat from the current path allow for a significant increase of the current rating of the cable fitting when compared to the known constructions.

These advantages are particularly beneficial for a cable conductor which is formed as a conductor of segmented type. Such conductors are typically installed in AC cables of highest current ratings and are optimized so that the increase of the AC resistance due to the skin effect is minimized. Hence, the ohmic losses under AC current are also minimized and are much smaller compared to those in a rod or tubular conductors applied in known constructions.

In a preferred embodiment of a cable fitting according to the invention a gap in the tubular duct between an outer surface of the cable conductor and an inner surface of the condenser core can be filled with a thermally conductive material. An advantage of such an embodiment is the decreased overall radial thermal resistance between the conductor and the outer surface of the cable fitting which leads to a higher heat dissipation rate of the cable fitting and to a higher current rating.

The thermally conductive material can comprise at least one of a solid, a powder or a gel. The solid material can comprise at least a hardened resin, in particular on the basis of an epoxy, a polyester or a polyurethane, or an elastomer, in particular on the basis of a silicone, or a polyurethane. The hardened resin can comprise a thermally conductive filler, in particular on the basis of a powder comprising a mineral, like quartz, a metal, like copper or aluminium, a nitride, like silicon nitride or boron nitride, on the basis of fibres, like carbon fibres or nanofibers, or on the basis of nanotubes. The powder material can comprise at least one of a silica sand, in particular quartz sand, or a metallic powder comprising metal grains or spheres. The gel material can comprise at least one of a silicone gel or a polyurethane gel.

The condenser core can comprise an electrically conducting central tube which forms an outer surface of the tubular duct, and the high-voltage current terminal can be fixedly secured to a top end of the central tube and can be electrically connected to a free end of the stripped-off section of the cable conductor. The central tube facilitates the mounting of the high-voltage current terminal and at the time favors the dissipation of heat generated in the section of the cable conductor running through the condenser core. The central tube can be connected to an innermost of the plurality of field-grading layers.

The central tube can run down from the high-voltage current terminal at most to the upper edge of the innermost field-grading layer. The diameter of the innermost field-grading layer then can be made smaller than the outer diameter of the central tube, thus resulting in a smaller overall diameter of the condenser core resp. of the cable fitting.

In order to enable outdoor applications of the cable fitting an external insulator can be molded directly around the outer surface of the condenser core.

The condenser core can comprise a net-shaped spacer, which is wound in spiral form around an axis. Each of the plurality of field grading elements can be inserted between successive windings of the spacer, and the polymeric matrix can penetrate the spacer and can embed the spacer and the field-grading layers.

The elastomeric stress-relief cone can be part of a stress-relief element. The stress-relief element can comprise the elastomeric stress-relief cone and a housing which encloses the elastomeric stress-relief cone. An upper part of the housing on the one side can comprise a first opening, which receives a conical lower end of the condenser core and on the other side can be fixedly secured to a mounting flange supporting the condenser core. A lower part of the housing can comprise a second opening, which receives a section of the high-voltage cable and a cable clamp, which fixes the cable to the housing.

In order to achieve a uniform distribution of the electric field inside and outside of the cable fitting the elastomeric stress-relief cone can comprise coaxially arranged an elastomeric insulator, a deflector and in case of a conical interface with an outer cone with respect to the condenser core additionally a connector shield which surrounds an end section of the cable insulation and an end section of the outer cone of the condenser core at a joint between these two end sections.

DETAILED DESCRIPTION OF PREFERENTIAL EMBODIMENTS OF THE INVENTION

Figure 1:
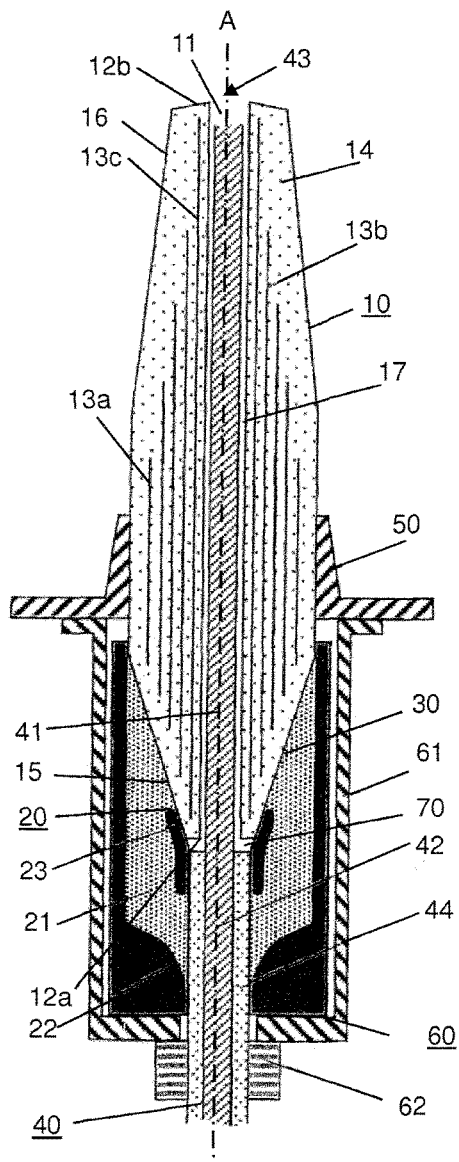
FIG. 1 is a cross-sectional view of a first embodiment of a cable fitting.

In the figures same reference symbols are used for identical parts and repetitive reference symbols may be omitted.

The five cable fittings shown in the FIGS. 1 to 5 are configured as high-voltage cable end terminations, each of which comprising coaxially arranged around an axis A a rigid conical insulator which is designed as a condenser core 10, an electrically insulating, elastomeric stress-relief cone 20 matching the condenser core 10 through a conical interface 30 and an axially aligned current path. The conical interface 30 forms a joint having a substantially conical shape. The substantially conical shape can taper along the axis A linear (forming a cone as defined in mathematics) or can taper according to any further function, for instance like a parabola, which allows the formation of the conical interface 30 when the condenser core 10 and the elastomeric stress-relief cone 20 are plugged together. The current path connects a cable conductor 42 of a high-voltage cable 40 to a high-voltage current terminal 43 which is arranged on top of the condenser core 10 and which is provided for electrical connection to a high-voltage component, like a high-voltage outdoor line, a transformer or a component of a gas-insulated switchgear arrangement. If the cable fitting is configured as a cable joint the high-voltage component is formed as a second cable.

The condenser core 10 comprises a tubular duct 11 which is aligned along the axis A and which extends from a front face 12a arranged on a lower end 15 of the condenser core 10 through the whole length of the condenser core to a front face 12b arranged on an upper end 16 of the condenser core. The tubular duct 11 receives a section 41 of the cable conductor 42 which is stripped off the cable insulation 44, which passes the two opposing front faces 12a and 12b of the condenser core 10 and which forms a current path for the current rated to the cable end termination. The condenser core 10 comprises a plurality of at least three electrically conducting field-grading layers 13a, 13b and 13c, which are arranged concentrically around the axis A. A rigid polymeric matrix 14 embeds the field-grading layers 13a, 13b and 13c. The innermost field-grading layer 13c is electrically connected to the section 41 of the cable conductor forming the current path and thus is kept on high-voltage potential, whereas the outermost field-grading layer 13a is electrically connected to a rigid metallic mounting flange 50 which his kept on ground potential. The remaining intermediate layers 13b are kept on floating potential such that the set of the field-grading layers form a capacitive field-grading system.

Figure 2:
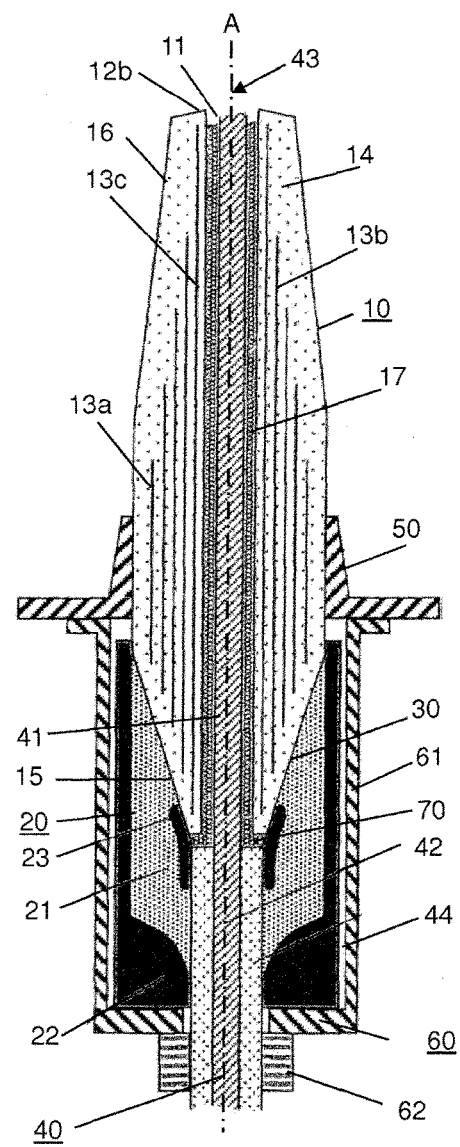
FIG. 2 is a cross-sectional view of a second embodiment of a cable fitting.
Figure 3:
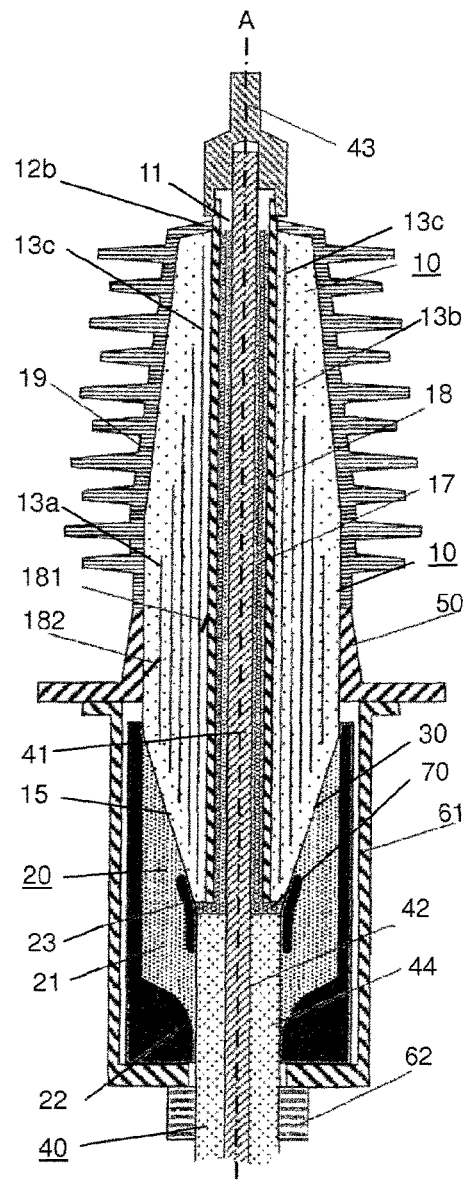
FIG. 3 is a cross-sectional view of a third embodiment of a cable fitting.
Figure 5:
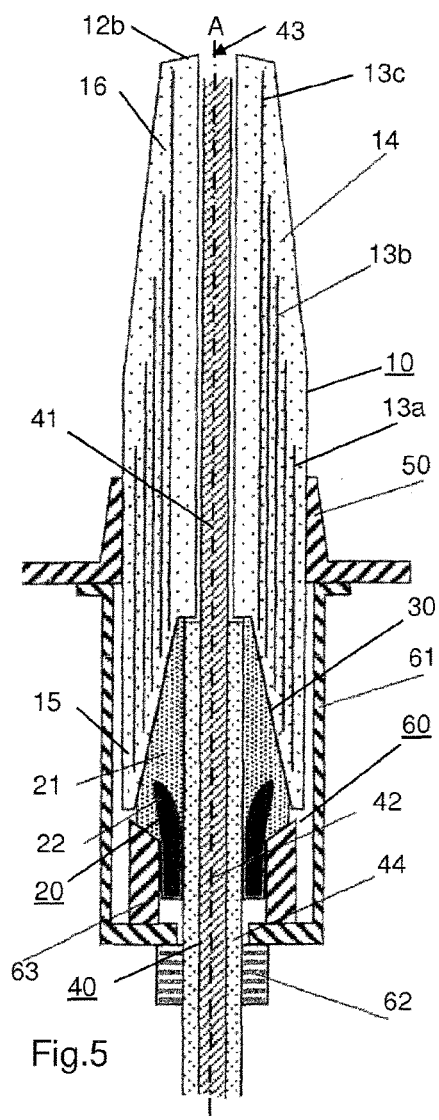
FIG. 5 is a cross-sectional view of a fifth embodiment of a cable fitting.

The condenser core 10 is fixedly secured to the mounting flange 50 which can be used to attach the high-voltage cable end termination to a support. The upper end 16 of the condenser core is of conical shape, but can also be of cylindrical or any further symmetrical shape. The lower end 15 of the condenser core 10 is of conical shape and forms an outer cone (as shown in FIGS. 1 to 3) or an inner cone (as shown in FIG. 5). The lower end 15 matches the stress-relief cone 20 through the conical interface 30.

The stress-relief cone 20 is enclosed in a housing 61 of a stress-relief element 60. An upper part of the housing 61 comprises a first opening which receives the conical lower end 15 of the condenser core 10 and which is fixedly secured to the mounting flange 50. An lower part of the housing 61 comprises a second opening which receives a section of the high-voltage cable 40. A cable clamp 62 serves the fixing of the cable 40 to the housing 61.

In order to achieve a uniform distribution of the electric field inside and outside of the cable end termination the elastomeric stress-relief cone 20 comprises coaxially arranged an elastomeric insulator 21 and a deflector 22, the lower end of which being connected to an end section of a conductive or semiconductive layer arranged on the outer surface of the cable insulation 44.

If the conical interface 30 comprises an outer cone with respect to the condenser core 10 (embodiments according to FIGS. 1 to 4) the elastomeric stress-relief cone 20 further comprises an electrical conducting or semiconducting connector shield 23 which surrounds an end section of the cable insulation 44 and an end section of the outer cone of the condenser core 10 at a joint 70 between these two end sections. The stress-relief cone 20 can be made using known technologies such as multi-step molding of electrically insulating material (elastomeric insulator 21) and conducting or semiconducting elastomeric material (deflector 22, connector shield 23).

The stress-relief element 60 has a hollow space matching the lower conical end 15 of the condenser core 10 through the interface 30 which in case of the embodiments according to FIGS. 1 to 4 is of outer cone type and in case of the embodiment according to FIG. 5 is of inner cone type. The conical interface 30 is achieved with a pressure which urges the conical surface of the elastomeric stress-relief cone 20 against the conical surface of the lower end 15 of the rigid condenser core 10. The pressure is generated with a compression system which excerts force on the elastomeric stress-relief cone 20 resp. on the interlace 30.

The condenser core 10 can be produced using the technology described in WO 2006/010280 and WO 2007/068130, in particular it can be manufactured by winding sheet-like net-shaped spacer around a mandrel or around the central tube. The field-grading layers are inserted between the layers of the spacer sheet material during the winding process. The wound core is subsequently impregnated with a hardenable resin, typically an epoxy resin comprising inorganic filler particles, and hardened. Detailed materials possible to be used are listed in WO 2006/010280. The application of inorganic filler particles in the epoxy resin has the advantage of increasing the thermal conductivity of the material building the condenser core 10, thus allowing for higher rate of heat transfer from the cable conductor 42 towards the outside environment and consequently for a possibility to apply higher current ratings. Alternatively the condenser core 10 can be produced using resin-impregnated paper technology in which crepe insulating paper is used as the spacer sheet material.

In the five embodiments of the high-voltage cable end termination according to FIGS. 1 to 5 the uninterrupted section 41 of the cable conductor 42 running through the cable end termination keeps the electric resistance in the cable end termination small. Thus the ohmic losses and the generation of heat within the cable end termination are kept small.

Furthermore the small diameter of the current path resp. of the stripped-off section 41 of the cable conductor 42 on the whole length of the condenser core 10 allows a small diameter of the innermost field grading layer 13c and, in consequence, a small diameter of the whole condenser core 10. This allows for manufacturing the condenser core 10 using less amount of insulating material 14. This material decreases the radial thermal resistance of the condenser core 10 and thus improves its ability to dissipate heat from the current path resp. the stripped-off section 41 of the cable conductor 42.

A cable end termination with an additional improvement of the ability to dissipate heat is shown in the embodiment of the invention according to FIG. 2. In this embodiment a gap 17 between the outer surface of the current path resp. the stripped-off section 41 of the cable conductor 42 and the inner surface of the condenser core 10, which borders the tubular duct 11 to its outside, is filled with a solid, powder or gel material which increases the radial thermal conductivity between the stripped-off section 41 of the cable conductor and the condenser core 10. The examples of the materials that can be used for the gap filling are as follows.

Solid materials:
hardenable resins, e.g. epoxy resin, polyester resin, polyurethane resin,
elastomeric materials, e.g. silicone elastomer, polyurethane elastomer,
the above-mentioned resins or elastomeric materials filled with a thermally conductive additive such as e.g. quartz, copper,
aluminum, silicon nitride, or boron nitride powder, carbon fibers, nanofibers or nanotubes.

Powder materials:
quartz sand or other silica sand,
powder consisting of metal grains or spheres.

Gel materials:
silicone gels, polyurethane gels.

The advantage of this solution is the decreased overall radial thermal resistance between the current path and the outer surface of the cable end termination which leads to higher heat dissipation rates and higher current ratings of the cable end termination resp. the cable fitting.

In the embodiment shown in FIG. 3 the condenser core 10 comprises an electrical conductive central tube 18 which typically is made of a metal, like an aluminum alloy, and which forms the outer surface of the tubular duct 11. The high-voltage current terminal is configured as metal fitting 43 and is mechanically fixed and electrically connected to the upper end of the central tube 18, typically by means of screwing. At the same time the metal fitting 43 also makes an electric connection to the current path resp. to the stripped-off section 41 of the cable conductor 42, typically by screwing or crimping.

The central tube 18 is electrically connected to the innermost field-grading layer 13c by means of a short high-voltage conductor 181 providing high-voltage potential to this layer. The metallic mounting flange 50 which can be made of an aluminum alloy is electrically connected by means of a ground connection 182 to the outermost field-grading layer 13a and provides ground potential to this layer. A section of the outer surface of the condenser core 10 extending from the front face 12b down to the upper edge of the mounting flange 50 is covered with an external insulator 19 with a number of sheds providing sufficient creepage length for wet or polluted environments. The external insulator 19 is molded over the condenser core 10 and typically is made of a silicone elastomer. In this embodiment of the cable end termination the gap 17, here arranged between the outer surface of the current path resp. the stripped-off section 41 of cable conductor 42 and the inner surface of the central tube 18, is filled with the material for increasing the radial thermal conductivity between the stripped-off section 41 of the cable conductor and the tube 18 resp. the condenser core 10.

Figure 4:
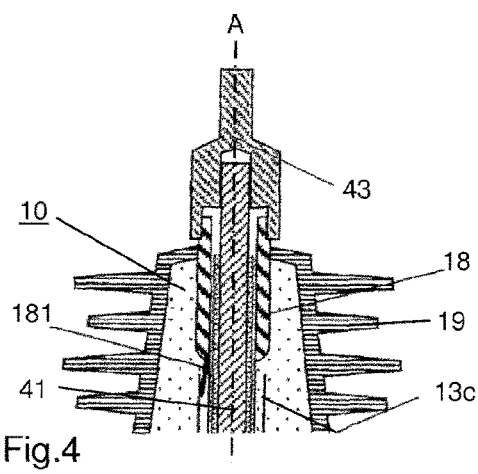
FIG. 4 is a cross-sectional view of a fourth embodiment of a cable fitting.

The embodiment shown in FIG. 4 differs from the embodiment according to FIG. 3 in that the central tube 18 is arranged only in the top part of the condenser core 10 and extends close to the top end of the innermost field-grading layer 13c to which the lower end of the central tube 18 is electrically connected by means of the short high-voltage connection 181. Thus the diameter of the innermost field-grading layer 13c can be made smaller than the outer diameter of the central tube 18. For that reason the condenser core 10 and thus the cable end termination comprise a smaller overall diameter than in the embodiment according to FIG. 3.

In the embodiment presented in FIG. 5 the condenser core 10 comprises a hollow space in its lower end 15. The stress-relief cone 20 is configured as an outer cone and matches the hollow space of the condenser core 10. Thus the condenser core 10 and the stress-relief cone 20 are joined with an interface 30 of the inner cone type. The stress-relief element 60 is held in position with a compression system 63 which excerts force on the elastomeric stress-relief cone 20 resp. on the interface 30 towards the upper end 16 end of the condenser core 10 resp. of the cable end termination. The interface 30 of the inner cone type completely eliminates the use of the connector shield 23 as afore-described in the embodiments according to FIGS. 1 to 4.

LIST OF REFERENCE SIGNS 10 condenser core
11 tubular duct
12a, 12b front faces
13a, 13b, 13c field-grading layers
14 rigid polymeric matrix
15, 16 ends of the condenser core
17 gap
18 electrically conductive central tube,
19 external insulator
20 elastomeric stress-relief cone
21 elastomeric insulator
22 deflector
23 connector shield
30 conical interface
40 high-voltage cable
41 section of the cable conductor 42
42 cable conductor
43 high-voltage current terminal
44 cable insulation
50 mounting flange
60 stress-relief element
61 housing
62 cable clamp
63 compression system
70 joint
181 high-voltage connection
182 ground connection

The invention claimed is:

1. A cable fitting for connecting a high-voltage cable, having a cable conductor and a cable insulating, which encases the cable conductor, to a high-voltage component, the fitting comprising:
coaxially arranged around an axis a rigid conical insulator, an electrically insulating, elastomeric stress-relief cone matching the rigid conical insulator through a conical interface and an axially aligned current path which connects the cable conductor to a high-voltage current terminal arranged on top of the rigid conical insulator and provided for connection to the high-voltage component,
wherein the rigid conical insulator is configured as a condenser core and comprises a plurality of electrically conductive field-grading layers which are arranged concentrically around the axis and a rigid polymeric matrix which embeds the field-grading layers,
wherein a section of the cable conductor, which is stripped-off a cable insulation, extends from the conical interface to the high-voltage current terminal and forms the current path, and
the condenser core comprises an axially aligned tubular duct which receives the stripped-off section of the cable conductor and which passes two opposing front faces of the condenser core.

2. The cable fitting according to claim 1, wherein the cable conductor is a conductor of segmented type.

3. The cable fitting according to claim 1, wherein a gap in the tubular duct between an outer surface of the cable conductor and an inner surface of the condenser core is filled with an electrically insulating, thermally conductive material.

4. The cable fitting according to claim 3, wherein the thermally conductive material comprises at least one of a solid, a powder or a gel.

5. The cable fitting according to claim 4, wherein the solid material comprises at least a hardened resin or an elastomer.

6. The cable fitting according to claim 5, wherein the hardened resin or the elastomer comprises a thermally conductive filler.

7. The cable fitting according to claim 4, wherein the powder material comprises at least one of a silica sand, or a metallic powder comprising metal grains or spheres.

8. The cable fitting according to claim 4, wherein the gel material comprises at least one of a silicone gel or a polyurethane gel.

9. The cable fitting according to claim 1, wherein
the condenser core comprises an electrically conductive central tube which forms an outer surface of the tubular duct, and
the high-voltage current terminal is fixedly secured to a top end of the central tube and is electrically connected to a free end of the stripped-off section of the cable conductor.

10. The cable fitting according to claim 9, wherein the central tube is electrically connected to an innermost of the plurality of field-grading layers.

11. The cable fitting according to claim 10, wherein the central tube runs down from the high-voltage current terminal at most to an upper edge of the innermost field-grading layer.

12. The cable fitting according to claim 1, wherein an external insulator is molded directly around an outer surface of the condenser core.

13. The cable fitting according to claim 1, wherein
the condenser core comprises a sheet-like net-shaped spacer, which is wound in spiral form around the axis,
each of the plurality of field grading elements is inserted between successive windings of the spacer, and
the polymeric matrix penetrates the spacer and embeds the spacer and the field-grading layers.

14. The cable fitting according to claim 1, wherein the rigid polymer matrix comprises a hardened epoxy resin comprising an inorganic filler.

15. The cable fitting according to claim 1, wherein
the elastomeric stress-relief cone is part of a stress-relief element,
the stress-relief element comprises the elastomeric stress-relief cone and a housing which encloses the elastomeric stress-relief cone,
an upper part of the housing on one side comprises a first opening, which receives a conical lower end of the condenser core, and on another side is fixedly secured to a mounting flange supporting the condenser core, and
a lower part of the housing comprises a second opening, which receives a section of the high-voltage cable and a cable clamp, which fixes the cable to the housing.

16. The cable fitting according to claim 15, wherein the elastomeric stress-relief cone comprises coaxially arranged an elastomeric insulator and a deflector.

17. The cable fitting according to claim 15, wherein a gap in the tubular duct between an outer surface of the cable conductor and an inner surface of the condenser core is filled with an electrically insulating, thermally conductive material.

18. The cable fitting according to claim 5, wherein the solid material comprises the hardened resin on the basis of an epoxy, a polyester or a polyurethane, or the elastomer on the basis of a silicone or a polyurethane.

19. The cable fitting according to claim 6, wherein the thermally conductive filler comprises one of a powder including a mineral, a metal, a nitride, fibres, or nanotubes.

20. The cable fitting according to claim 16, wherein the conical interface comprises an outer cone of the condenser core, and further comprising a connector shield which surrounds an end section of the cable insulation and an end section of the outer cone of the condenser core at a joint between these two end sections.

21. The cable fitting according to claim 19, wherein the thermally conductive filler comprises one of the powder including copper or aluminum, silicon or boron nitride, carbon fibres or nanofibers.

22. The cable fitting according to claim 16, wherein a gap in the tubular duct between an outer surface of the cable conductor and an inner surface of the condenser core is filled with an electrically insulating, thermally conductive material.

* * * * *